United States Patent [19]

Hertel

[11] 4,115,752
[45] Sep. 19, 1978

[54] ECHO SOUNDING DEVICE WITH CATHODE RAY TUBE DISPLAY

[75] Inventor: Roger C. Hertel, Minneapolis, Minn.

[73] Assignee: Buckbee-Mears Company, St. Paul, Minn.

[21] Appl. No.: 806,761

[22] Filed: Jun. 15, 1977

[51] Int. Cl.² .................. G01S 9/68; G01S 9/70; G01S 7/62
[52] U.S. Cl. .................................................. 340/3 C
[58] Field of Search ........................... 340/3 C, 3 F

[56] References Cited

U.S. PATENT DOCUMENTS

| | | | |
|---|---|---|---|
| 3,380,293 | 4/1968 | Murphy | 340/3 C |
| 3,388,377 | 6/1968 | Folsom et al. | 340/3 C |
| 3,790,925 | 2/1974 | Ahrens | 340/3 C |
| 3,914,730 | 10/1975 | Jones et al. | 340/3 C |

Primary Examiner—Richard A. Farley
Attorney, Agent, or Firm—Jacobson and Johnson

[57] ABSTRACT

An echo sounding device for searching and exploring the depth of a body of water is provided with a cathode ray tube (CRT) display showing the echo returns. A memory device is provided to store the electrical signal levels of the echo returns while new signal returns are being received to enable presentation of a bar-graph type of display on the CRT.

2 Claims, 1 Drawing Figure

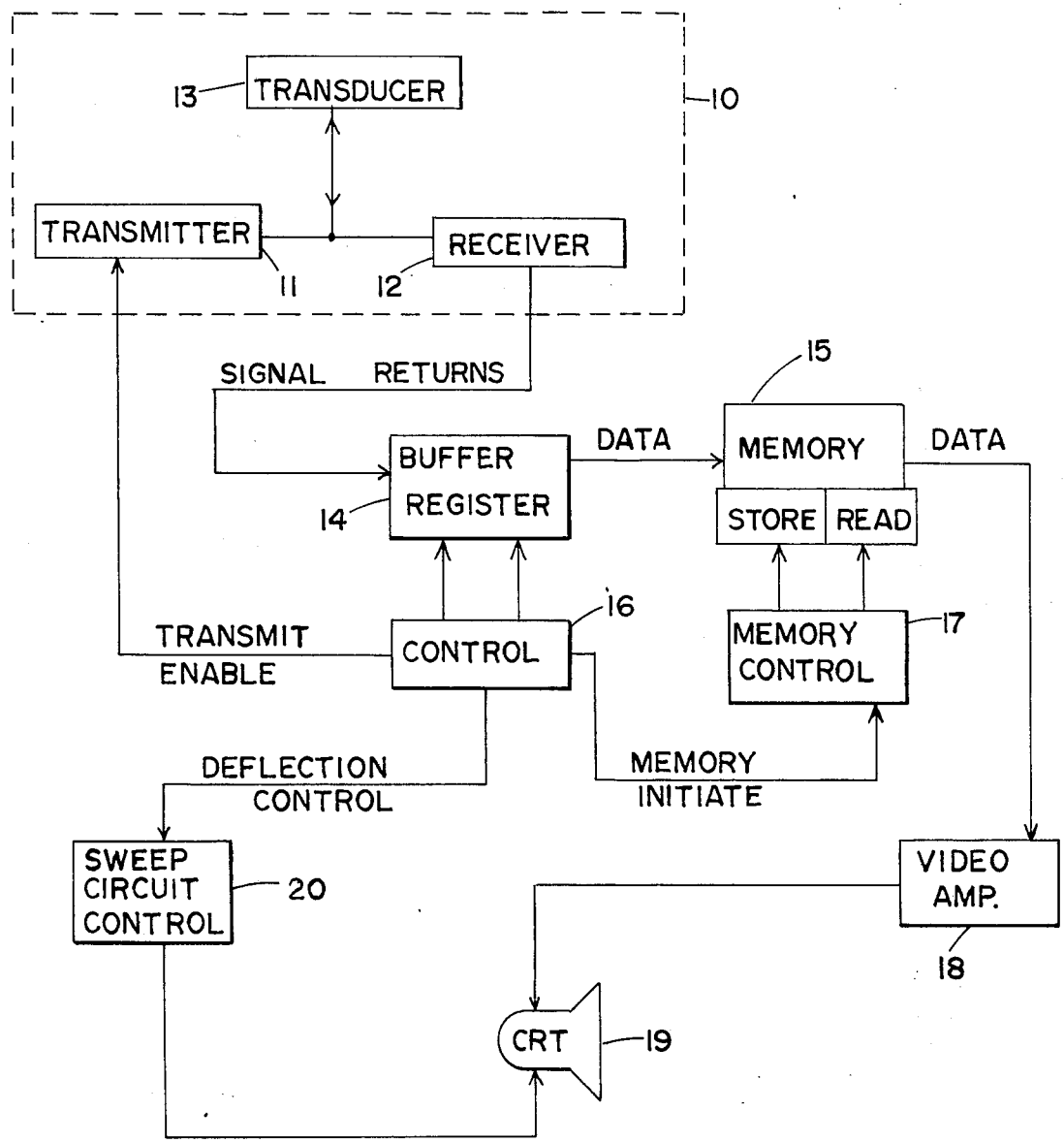

ECHO SOUNDING DEVICE WITH CATHODE RAY TUBE DISPLAY

BACKGROUND OF THE INVENTION

This invention is directed for use in underwater searching or exploring. The device is used principally for locating and viewing the bottom of a body of water and for searching for objects, usually fish, in the body of water. However, for simplicity the device will usually hereinafter be referred to as a depth finder but with the understanding that it can serve other functions as well.

In one known type of depth finder the display is in the form of a bar-graph on a strip chart produced by a stylus inking or burning in markings, which represent echoes or returns, on a paper strip. Briefly, in this type of paper-stylus or strip chart device, a burst or pulse of sonar energy is emitted in a beam from a transducer fixedly located on the vessel. The stylus makes a vertical sweep across the paper strip for each transmitted pulse and when an echo is received the stylus makes some visible mark on the strip of paper. The strip moves transversely which is somewhat representative of the movement of the vessel. The stylus makes its vertical travel for each transmitted pulse and makes a visible marking for each received echo. This then forms what is known as a bar-graph type pattern for the viewer. Assuming generally that the transducer is directed to beam its pulse downward, the produced visible pattern then gives the viewer a general overall view of the area below the vessel as the vessel passes over it. The vertical sweep of the stylus represents the depth or range from the vessel and the stylus oscillates vertically at about the pulse repetition rate of the transmitted pulse.

Another known type of depth finder produces a display on a CRT but in a PPI type of pattern. In this device the transducer sweeps back and forth to transmit the sonar bursts over an area and the received echoes are then displayed as brightened areas on the face of the CRT. This type of depth finder and display gives the viewer an overall view of the area below, in front, behind, or alongside, the vessel. In this type of device, as the transducer continues to sweep the area being explored, returns or echoes are continuously being received to update the presentation of detected objects in the area being searched. In other words, where a target is viewed on the screen it means that the object is continuing to produce an echo as the beam of sonar energy sweeps across it. When the object is no longer being struck by the transmitted sonar pulse or the reflection is too small or too distant to make a showing on the CRT, it no longer appears on the CRT. This is distinguished from the paper-stylus bar-graph type display. In the latter when an echo is received it is permanently recorded even though the object might have since moved or disappeared.

Conventionally, depth finders have a transceiver which transmits a sonar or ultrasonic signal through a transducer into the body of water and the echoes or returns reflected back from the bottom of the body of water and objects in the water are picked up by the transducer and amplified in a receiver. To date the sonar depth finders which provide a video or visual presentation of the signal returns in bar-graph form have used a moving paper (or similar) graph and a stylus which inks or burns-in a pattern on the graph paper corresponding to the occurrence of returns or echoes from the transmitted pulses, as described above. This type of mechanical reproduction for video presentation of the returns has a number of drawbacks. For one, because of the relatively slow speed of operation of the stylus, the pulse repetition rate of the transmitted signal is limited and is virtually fixed whereas at times it might be useful to have a faster pulse repetition rate in order to get a more distinct view of the area being searched. Furthermore, the mechanical movement of the stylus and the continuing movement of the graph paper can result in malfunctions especially since the units are often used in an environment where the humidity is high and the device may be located in a salt atmosphere. In addition, because it is necessary from time to time to replace the rolls of chart paper and to adjust the stylus, the mechanical units must be accessible and this can lead to mishandling and damage to the unit.

SUMMARY OF THE INVENTION

In the present invention a CRT is adapted to function with and in response to a conventional sonar transceiver to give an electronic video or visual bar-graph type of presentation of the received returns or echoes. The invention provides many advantages and feautures as compared to the more conventional graph paper-stylus device which records a bar-graph type presentation. Because the CRT display device operates at a higher rate of speed, the pulse repetition rate of the transmitted ultrasonic signal can be varied as desired over a wider range. Furthermore, because of the electronic nature of the video screen, it can be hermetically sealed so as to be virtually free from any ill effects of the environment. Also, it is not necessary to make the mechanism readily accessible to the user since about the only time it will need to be accessed will be for occasional repair of a malfunction. This can be accomplished readily by removing the display unit from the environment in which it is normally operated and returning it to some other less offensive environment for repair.

In order to provide a video presentation of earlier received returns along with newly received returns to produce the bar-graph type of presentation in the CRT, the invention incorporates a memory for storing the electrical signal representations of the echo signals. As a further feature, use of the memory permits the device to be operated in a stop mode. The operator can set the device so that the presentation being displayed on the screen remains fixed and not changed or updated newly received echo signals. This permits the operator to look closely and in detail at a previously searched area if he desires.

In summary, then, the instant invention utilizes substantially the same transmitter, receiver and transducer section of a depth finder which is used to produce a bar-graph type display on a paper strip to produce a bar-graph type display in a CRT by incorporating a memory device and circuitry for converting the electrical signals into suitable form for use by the memory and the CRT.

DESCRIPTION OF PREFERRED EMBODIMENTS

The drawing illustrates in block diagram form the functional elements of the invention. A sonar transceiver 10 is constructed and, for the most part, operates and functions in the conventional fashion. It is made up of a transmitter section 11, a receiver section 12 and a transducer 13. The transmitter develops electrical signal pulses which are carried to the transducer which converts the electrical signals into sonar energy pulses which are transmitted as a beam into the body of water. Any object within the area covered by the beam which is close enough to the transducer, which is large enough in size and which has reflective characteristics will reflect enough of the transmitted pulse back to the transducer to produce a signal indication of the presence of the object. Any such reflection or echo that is picked up by the transducer 13 is converted into an electrical signal and conducted to the input of the receiver 12 where it is amplified and otherwise processed as necessary. The return signals are received in serial fashion and are outputted from the receiver in the same serial fashion. The receiver circuit is designed and operated to distinguish between actual signal returns and sporadic noise signals. The depth finder determines the presence or absence of an object in the body of water and locates the bottom or other confines of the body of water. The signal returns are processed by the receiver circuit to produce serialized signal trains which given an indication of the presence or absence of an object. In other words, the resulting signal train can be considered to be bilevel in nature, a first minimum signal level indicating the presence of an object or an actual return and a different level indicating the absence of any detected object. For the purposes of describing this invention the serialized signal train out of the receiver 12 may be referred to, from time to time, as being high or up to denote the presence of a reflected signal and low or down to denote the absence of any received reflected signal. All of the foregoing description is conventional and none of it is considered to be a unique or novel aspect of the instant invention.

Continuing on with the block diagram illustrated in the drawing, the serialized received electrical signals, representing the returns from the transmitted signal, are illustrated as being fed as an input into a buffer register 14. In a conventional fashion, the highs or ups are converted to an electrical signal representation of a binary "1" and the lows or downs are converted to an electrical signal representation of a binary "0." For reasons which will be explained later, the buffer register is made up of 128 stages, each stage capable of storing a signal representation of a binary "1" or "0" corresponding to a respective return or absence of a return in the serialized signal train. In other words, the buffer register is used to temporarily store in binary signal fashion the received signal train that was in response to a transmitted burst of sonar energy divided up into 128 segments. This is accomplished in a conventional fashion. In the instant embodiment, the received signals are fed serially into the lowest order stage of buffer register 14 from the receiver 12 and control 16 provides gating pulses into gates (not shown) to advance the signal input from the lowest order stages successively into the next higher order stages until all 128 stages of the buffer register are filled. In other words, the signals are advanced until the signal first inputted into the lowest order stage eventually appears in the 128th or highest order stage. Where the signal input is low, the corresponding stage of buffer register 14 ultimately receives and temporarily stores a signal representation of a binary "0" and where the signal input is high, a signal representation of a binary "1" appears in the corresponding stage of buffer register 14. Control 16 provides 128 gating pulses during the interval between transmitted pulses and for a period of time determined by the range setting. For a shorter range setting the gating pulses are provided for a shorter time period than for a longer range setting. In this fashion control 16 prevents any signal return from beyond the range setting from entering buffer register 14 so that buffer register 14 will then be holding, in substance, the segmented received signal returns from a given transmitted pulse.

After the received signal return has been segmented, it is held by the buffer register 14 until it is transferred to memory 15 when memory is ready to receive it. Another criteria is that it should be transferred to memory before signal returns from the next transmitted pulse are received. Control 16 provides the proper gating signals at the proper time to transfer the content of the buffer register 14, which may now be referred to from time to time as data, to memory 15. Memory 15 operates in a conventional and well-known fashion. Data stored in memory 15 can be removed or read out and new data can be written or stored into memory 15. Control 16 provides suitable memory initiating pulses to a memory control circuit 17 for selectively storing data into memory 15 or reading data out of memory 15. Typically, the memory 15 can be a nondestructive readout (NDRO) or a destructive readout (DRO) device. In the former each time data is read out of the memory it does not have to be restored, it is automatically retained in the memory until destroyed in some other fashion. In the latter the data is automatically destroyed each time it is read out and must be restored in order to keep from losing it. In any event, ordinarily the memory operates only in a read mode or a store cycle, not both concurrently. As stated earlier, at the proper time control 16 provides a memory initiate signal to memory control 17 which in turn activates the store cycle while data is being transferred from the buffer register to the memory 15 so that this data is suitably recorded or stored in the memory 15. The buffer register 14 is then ready to accept a new set of signal returns. The specific circuitry utilized for effecting the transfer of the data from buffer register 14 into memory 15 is a matter of choice and is not considered to be unique or novel and is easily selected by one of ordinary skill in the art.

The type of memory device for use in memory 15 is purely a matter of choice. Naturally it must have the typical conventional characteristics of storing and holding data at controlled locations and permitting the data to be selectively read out of the various locations. Of course memory 15 must be chosen so that its operation is compatible with the other units and sections of the depth finder.

These characteristics of the memory should probably be delved into in some detail at this juncture. Principally, the operation of the CRT which displays the data in the memory is of concern. Because of the retention properties of the face of the CRT, the target information (in data form in this instance) must be fed to the CRT a number of times while the electron beam sweeps through the raster of the CRT face so that the target then becomes visible to the eye. Therefore the memory must be chosen so that it operates at a fast enough rate for the data to be presented often enough as the CRT electron beam sweeps to make this visible impact on the face of the CRT. This then points up the need for the buffer register 14 as a means of synchronizing the relatively slow rate at which signal returns are received from a transmitted pulse to the rapid rate of the operation of the memory device and, in turn, the CRT. Typically, and no limitation thereto being intended, the data in the memory 15 might be read out and transferred to the CRT five times to enable the CRT to present a visible pattern on its face. This means then that the memory must operate rapidly enough to go through five readout cycles before a store cycle is initiated in order to transfer new data (the signal returns from another transmitted pulse) into the memory. This also is not unique nor novel in the instant invention and it is known that in the past devices used memories for holding information in order to display it properly on a CRT.

To provide a display of the bar-graph type on the face of the CRT, a 128 by 128 display raster was selected. This selection was somewhat arbitrary but yet controlled by practical considerations. For the given size and type of CRT it was decided that a display raster in that order of magnitude would produce a clear display that the eye can resolve and yet encompass an area that would be meaningful to the observer. Naturally the eye would accept and would not be able to distinguish from other display rasters of say 125 by 123 or some other odd combination. However, as is well known, memory devices, registers and the like used in the electronics for processing and handling information in binary form are normally available in increments of some power of two so that a 128 by 128 memory device and a 128 bit register are readily available commercially. This then explains why the buffer register consists of 128 stages and why the received signals are segmented into 128 bits. While physically the memory 15 may take a somewhat different form, operatively it consists of 128 different memory locations with each location capable of storing 128 segmented pieces or bits. Correspondingly, the display on the CRT then can be considered to be bar-graph type consisting of an array of 128 vertical lines or columns and 128 horizontal rows. Each column represents the signal return from a different transmitted pulse in data signal form and each row then constitutes the binary value ("0" or "1" or low or high) of a given signal return in its segmented form.

As stated previously, memory 15 operates in the conventional and well-known fashion. It may be a destructive readout (DRO) or a nondestructive readout (NDRO) memory. It may or may not be a random-access memory (RAM). In the conventional fashion, during the storing or writing mode, the data is fed from buffer register 14 to memory 15 and under direction of memory control 17 which obtains suitable control signals from control 16, the storage cycle is initiated so that the 128 bit data in buffer register 14 is stored at a preselected location in memory 15. Each time new data is entered into buffer register 14 and at some time before new signal returns are brought into the buffer register, the previously segmented data is transferred from buffer register 14 and stored in memory 15. This, as previously stated, is under control of control 16 so these functions take place in their correct sequence and within their allowed time periods.

The data stored in memory 15, in due course and under direction of the memory control 17 as controlled by control 16, is read out of memory through video amplifier 18 and fed into CRT 19 where it is presented in video form on the face of the CRT. The readout is performed in a conventional fashion. The precise manner in which this is done is not important nor unique, but the effect is that as each set of data, which represents the signal returns from a transmitted pulse segmented into 128 bits, is read out of the memory 15, it is displayed as a single vertical line on the face of the CRT 19. Memory 15 is arranged and the readout is controlled in conjunction with the operation of the CRT sweep circuit control 20, which receives suitable deflection control signals from control 16, so that as the CRT electron beam sweeps horizontally and vertically, the data which constitutes the signal return from the most recent transmitted pulse is displayed vertically at the rightmost side of the face of CRT 19, the oldest available data which is still contained in memory 15 is displayed vertically at the leftmost side of the face of the CRT and the intermediate data is displayed between the two.

CRT 19 is conventional in design and operation. It has the conventional horizontal and vertical sweeps controlled by sweep circuits 20 and a video input through video-amplifier 18. In the preferred embodiment, the CRT screen is substantially rectangular, although no limitation thereto is intended. For ease of explanation and understanding, the bar-graph presentation on the screen of CRT 19 can be considered to be made up of a number of closely spaced vertical lines, each vertical line constituting the video display of the echoes or returns received from a given transmitted pulse. Looking at the face of the CRT from the viewer's location, the return from the most recently transmitted pulse appears at the rightmost side of the CRT and the return from the next most recently transmitted pulse appears to the left and adjacent the most recent return, etc. so that the leftmost line constitutes the oldest return which is still available for display. Because of the nature of the horizontal stepping of the display and the retention properties of the face of the CRT screen, the received echoes produced by an object which reflects at least part of the transmitted pulses are "painted" on the CRT screen for the viewer to see and observe. As each new sonar pulse is transmitted, a corresponding return presentation transplants the previous return presentation on the rightmost edge of the screen and the latter then appears at the next adjacent left position, etc. so that the previous oldest return, which had been at the leftmost position, falls out of the picture and is displaced by what had been the next most oldest return. In this fashion the display is continually changing to update the area being displayed as each new pulse is transmitted. In essence then, the viewer sees the presentation as the newest information coming in on the righthand side of the screen and the oldest information appearing at the leftmost side of the screen so that the presentation shifts right to left. This can be compared to the bar-graph display of the prior art chart recorders in which the paper is moved lengthwise or from right to left and the recording stylus moves vertically.

In the conventional fashion, the controls of the CRT are set so that as the electronic beam sweeps to provide the presentation in the manner described above, where a signal indication of an echo or return occurs in the data stored in memory, it is fed into the CRT through video amplifier 18 and the screen is brightened to give a visual display of an object being detected by the transmitted pulse. Further analogizing the CRT display to the strip chart display, in the latter as the stylus moves through its vertical trace a positive echo or return causes the stylus to print or burn an image in the graph paper. The distance which the stylus travels vertically from top to bottom represents the distance from the transducer to the object which caused the return. In similar fashion in the instant invention, a series of 128 vertical lines on the face of the CRT represent transmitted pulses and as the electronic beam sweeps across the face of the CRT, a signal representing the occurence of a positive echo causes the beam to brighten the face of the screen to thereby indicate the presence of a target or object. Also, as with the strip chart recording, the vertical distance from the top of the screen to the brightened area represents the distance of the object from the transducer.

As described earlier, in the instant embodiment, no limitation thereto being intended, the presentation across the breadth of the CRT screen is chosen to constitute the returns or echoes from 128 transmitted pulses. In other words, the CRT screen can be considered to be broken up into 128 vertical lines from right to left. Each of these lines constitutes a video presentation of the returns from a single separate transmitted pulse and wherever a brightened area appears on the vertical line it constitutes a video presentation of an echo being returned from that corresponding transmitted pulse. As described earlier, the returns are digitized by segmenting the received electrical signal into 128 discrete parts. In the CRT presentation then, it can be considered that each vertical line is made up of 128 discrete individual lengths. Any individual length denoting or constituting a received echo or return is shown by the screen being brightened at the location along the vertical line whereas the absence of any positive echo is noted by the length along the corresponding vertical line remaining unbrightened.

If the device uses a DRO memory, whenever data is read out of the memory it must be restored into the memory if it is going to be displayed again. In the case of a NDRO memory, the data remains intact at the time it is read out and does not have to be restored. The only critical thing about the control of the memory readout is that the memory locations must be read out in a predetermined order so that the presentation on the face of the CRT appears in the order and in the form described previously. The manner in which this is accomplished is not considered unique or novel and is a matter of choice, the choice being dependent on the type of circuits and components being used. The deflection control signal applied to the sweep circuit control 20 from control 16 merely coordinates the vertical and horizontal sweeps of CRT 19 with the memory readout so that the data which is read out of the memory appears on the face of the CRT in its prescribed order and at its prescribed location.

Control 16 provides a transmit enable signal to transmitter 11 in transceiver 10. By a sweep speed selector, not shown, this transmit enable signal can be selectively varied to increase or decrease the repetition rate of the transmitted pulses, as desired. The device may be also provided with a depth range selector, not shown. For example, if it is desired to have the unit operate to show objects down to 120 feet in depth, then the presentation on the face of the CRT will have to be adjusted as compared to that used for displaying depths down to only 30 feet. Although the maximum possible pulse repetition rate is quite high, as a practical matter it is usually kept at a relatively slow rate otherwise the CRT display would cover only a very small area. The presentation on the face of the CRT changes with change in the pulse repetition rate or sweep speed. If the operator desires to view a larger area, then a slower repetition rate is used and the display changes more slowly. It is also possible to completely stop the display on the CRT so that the display remains unchanged. No pulses are transmitted and, therefore, no new returns or echoes are received in the stop mode. However, the device can be designed so, if desired, pulses can continue to be transmitted even though the display remains unchanged.

Control 16 is also conventional and its design is a matter of choice. It may consist of a basic oscillator which feeds a frequency divider network to obtain a series of timing or clocking pulses which are combined with other signal indications of conditions of operation to produce the control signals as described hereinbefore. Control 16 also contains pulse shaping circuits and the like to produce signals which are compatible in size, shape and amplitude level, with the signals produced and developed elsewhere in the apparatus and with the circuits into which the control signals are fed.

I claim:

1. In an echo sounding device having means for transmitting sounding pulses, means for receiving signal returns from the transmitted sounding pulses and for converting the signal returns into a series of electrical signals, and a cathode ray tube having vertical and horizontal sweeps and a display face, the improvement comprising: N stage binary register means coupled to said receiving means for forming the signal returns from each transmitted pulse into a series of N segments, each stage which represents a corresponding segment being set to a binary "0" state in the absence of a received echo signal and being set to a binary "1" state upon the presence of a received echo signal; static memory means coupled to said receiving means for storing the binary-valued segmented electrical signal representations of the received signal returns from each transmitted sounding pulse; and means for feeding the stored electrical signal representations of the received signal returns from the memory means to the cathode ray tube for visually displaying a plurality of said signal returns vertically side by side concurrently on the cathode ray tube face.

2. The invention as described in claim 1 further including means for synchronizing the horizontal and vertical sweeps of the CRT with the feeding of the stored electrical representations of the received signal returns from the memory to the CRT for displaying said signal returns in a series of vertical lines arranged side by side across the face of the CRT.

* * * * *

UNITED STATES PATENT AND TRADEMARK OFFICE
CERTIFICATE OF CORRECTION

PATENT NO. : 4,115,752
DATED : September 19, 1978
INVENTOR(S) : Roger C. Hertel

It is certified that error appears in the above-identified patent and that said Letters Patent are hereby corrected as shown below:

Col. 8, line 41 change "receiving" to --register--

Signed and Sealed this

First Day of February 1983

[SEAL]

Attest:

GERALD J. MOSSINGHOFF

Attesting Officer     Commissioner of Patents and Trademarks